United States Patent [19]
Mita et al.

[11] Patent Number: 5,824,991
[45] Date of Patent: Oct. 20, 1998

[54] PULSED ARC WELDING METHOD AND APPARATUS

[75] Inventors: Tsuneo Mita, Hiratsuka; Tsuneo Shinada, Yokosuka; Hitoshi Matsui, Toyota, all of Japan

[73] Assignees: Hitachi Seiko Ltd., Ebina; Toyota Jidosha Kabushiki Kaishi, Toyota, both of Japan

[21] Appl. No.: 748,924

[22] Filed: Nov. 14, 1996

[30] Foreign Application Priority Data

Nov. 14, 1995  [JP]  Japan ................................ 7-295644

[51] Int. Cl.⁶ .......................................................... B23K 9/09
[52] U.S. Cl. .................................. 219/130.51; 219/130.21
[58] Field of Search ........................ 219/130.51, 130.21, 219/130.31, 130.32, 130.33, 137 PS

[56] References Cited

U.S. PATENT DOCUMENTS

| | | | |
|---|---|---|---|
| 4,485,293 | 11/1984 | Tabata et al. | 219/130.51 |
| 4,518,844 | 5/1985 | Needham | 219/130.51 |
| 4,647,754 | 3/1987 | Hirasawa | 219/130.51 |
| 4,697,062 | 9/1987 | Awano et al. | 219/130.51 |
| 4,717,807 | 1/1988 | Parks et al. | 219/130.21 |
| 4,889,969 | 12/1989 | Kawai et al. | 219/130.51 |
| 5,406,052 | 4/1995 | Mizuno et al. | |

FOREIGN PATENT DOCUMENTS

| | | |
|---|---|---|
| 0 342 691 A2 | 11/1989 | European Pat. Off. . |
| 0 607 819 A1 | 7/1994 | European Pat. Off. . |
| 57-4472 | 3/1982 | Japan . |
| 6-23547 | 2/1994 | Japan . |

*Primary Examiner*—Clifford C. Shaw
*Attorney, Agent, or Firm*—Antonelli, Terry, Stout & Kraus, LLP

[57] ABSTRACT

A pulsed arc welding apparatus includes a short circuit detecting circuit for detecting a time during which a short circuit is being produced by melting a consumable electrode across a consumable electrode and a base metal, a comparison circuit for comparing an integrated value or a mean value of short circuit generating time detected by the short circuit detecting circuit with an optional set value, and a control circuit for controlling either one of the supply time of the pulse current and the base current supply time in accordance with the result of comparison by this comparison circuit, thereby to control the arc length.

13 Claims, 5 Drawing Sheets

PULSED ARC WELDING METHOD AND APPARATUS

BACKGROUND OF THE INVENTION

The present invention relates to a pulsed arc welding method and apparatus in which a droplet of a consumable electrode is transferred to a base metal in a gas shield.

There is a pulsed arc welding apparatus disclosed in JP-A-6-23547 as this sort of technique. In this apparatus, a short circuit generated when a wire and a base metal come into contact with each other through a droplet of the wire is detected, it is decided whether the timing of generation of the short circuit is too early, appropriate, or too late for the pulse period, and pulse parameters are set automatically so that a short circuit is generated properly.

SUMMARY OF THE INVENTION

It is an object of the present invention to provide a pulsed arc welding method and apparatus capable of always maintaining a proper arc state even when short circuit generation is changed.

In order to achieve the above-mentioned object, a first aspect of the present invention exists in that a pulsed arc welding method detects the amount of time when a short circuit is being generated by melting of the consumable electrode, and controls an arc length so that a mean value or an integrated value of this amount of time shows an optional set value.

When the mean value or the integrated value of the short circuit time is larger than the optional set value, the supply time of a base current is decreased in accordance with the difference therebetween, and, when the value of the short circuit time is smaller, the supply time of the base current is increased. In this way, it is possible to maintain the arc length in an optimum state only by controlling the supply time of the base current.

When the mean value or the integrated value of the short circuit time is larger than the optional set value, the supply time of the base current is decreased and the supply period of the pulse current is increased at the same time in accordance with the difference therebetween and, when the mean value or the integrated value is smaller, the supply time of the base current is increased and the supply period of the pulse current is decreased at the same time. In this manner, the arc length is maintained in an optimum state with the supply time of the base current and the supply period of the pulse current.

When it is required to compensate for resistance generation of heat produced when the consumable electrode projects beyond a predetermined length, respective supply periods of the base current and the pulse current are decreased in case the mean value or the integrated value of the short circuit time is larger than an optional set value, in accordance with the difference therebetween, and respective supply periods of the base current and the pulse current are increased in case they are smaller than the optional set value.

When the mean value or the integrated value of the short circuit time is larger than an optional set value, the supply period of the pulse current is decreased in accordance with the difference therebetween, and, when it is smaller than the optional set value, the supply period of the pulse current is increased. In this manner, it is also possible to maintain the arc length in an optimum state by controlling the supply period of the pulse current.

A second aspect of the present invention exists in that a pulsed arc welding apparatus comprises a short circuit detecting circuit for detecting the amount of time when a short circuit is being produced between a consumable electrode and a base metal by melting of the consumable electrode, a comparison circuit for comparing the integrated value or the mean value of the short circuit generating time detected by the short circuit detecting circuit with an optional set value, and a control circuit for controlling at least either one of the supply time of the pulse current and the supply time of the base current in accordance with the result of comparison by the comparison circuit.

The comparison circuit has a base time setting unit for setting the supply time of the base current, a pulse width setting unit for setting the supply time of the pulse current, an adder for obtaining the difference between the short circuit time detected by the short circuit detecting circuit and the predetermined short circuit set time, an integrated/mean value calculator for calculating the integrated value or the mean value of the difference sent from the adder, a base time regulator for increasing or decreasing the supply time of the base current from the base time setting unit in accordance with the integrated value or the mean value so as to obtain the time for ending to supply the base current, a selection switch which closes when the integrated value or the mean value is received from the integrated/mean value calculator, and a pulse width regulator for increasing or decreasing the supply time of the pulse current from the pulse width setting unit in accordance with the integrated value or the mean value so as to obtain the time for terminating the supply of the pulse current. With this, the supply time of the pulse current and the base current is controlled thereby to maintain the arc length in an optimum state.

Further, the comparison means has a base time setting unit for setting the supply time of the base current, a pulse width setting unit for setting the supply time of the pulse current, an adder for obtaining the difference between the short circuit time detected by the short circuit detecting circuit and the predetermined short circuit setting time, an integrated/ mean value calculator for calculating the integrated value or the mean value of the difference sent from the adder, and a pulse width regulator for increasing or decreasing the supply time of the pulse current from the pulse width setting unit in accordance with the integrated value or the mean value so as to obtain the time for terminating the supply of the pulse current. With this, it is possible to maintain the arc length in an optimum state only by controlling the supply time of the pulse current.

Furthermore, the comparison means has a base time setting unit for setting the supply time of the base current, a pulse width setting unit for setting the supply time of the pulse current, an adder for obtaining the difference between the short circuit time detected by the short circuit detecting circuit and the predetermined short circuit setting time, an integrated/mean value calculator for calculating the integrated value or the mean value of the difference sent from the adder, a base time regulator for increasing or decreasing the supply time of the base current from the base time setting unit in accordance with the integrated value or the mean value so as to obtain the time for ending to supply the base current, a first selection switch which is closed when the integrated value or the mean value is received from the integrated/mean value calculator, a first pulse width regulator for receiving the pulse current supply time from the pulse width setting unit in accordance with the integrated value or the mean value when a second selection switch is in a first state, decreasing the pulse width when the integrated value or the mean value shows a positive value and increasing the pulse width when the integrated value or the mean value shows a negative value, and a second pulse width regulator for receiving the pulse current supply time from the pulse width setting unit in accordance with the integrated value or the mean value when the second selection switch is in a second state, increasing the pulse width when the integrated value or the mean value shows a positive value and decreasing the pulse width when the integrated value or the mean value shows a negative value. With this, it is possible to select necessity or unecessity of compensation for resistance generation of heat produced by projection of a consumable electrode.

DESCRIPTION OF THE PREFERRED EMBODIMENTS

Figure 1:
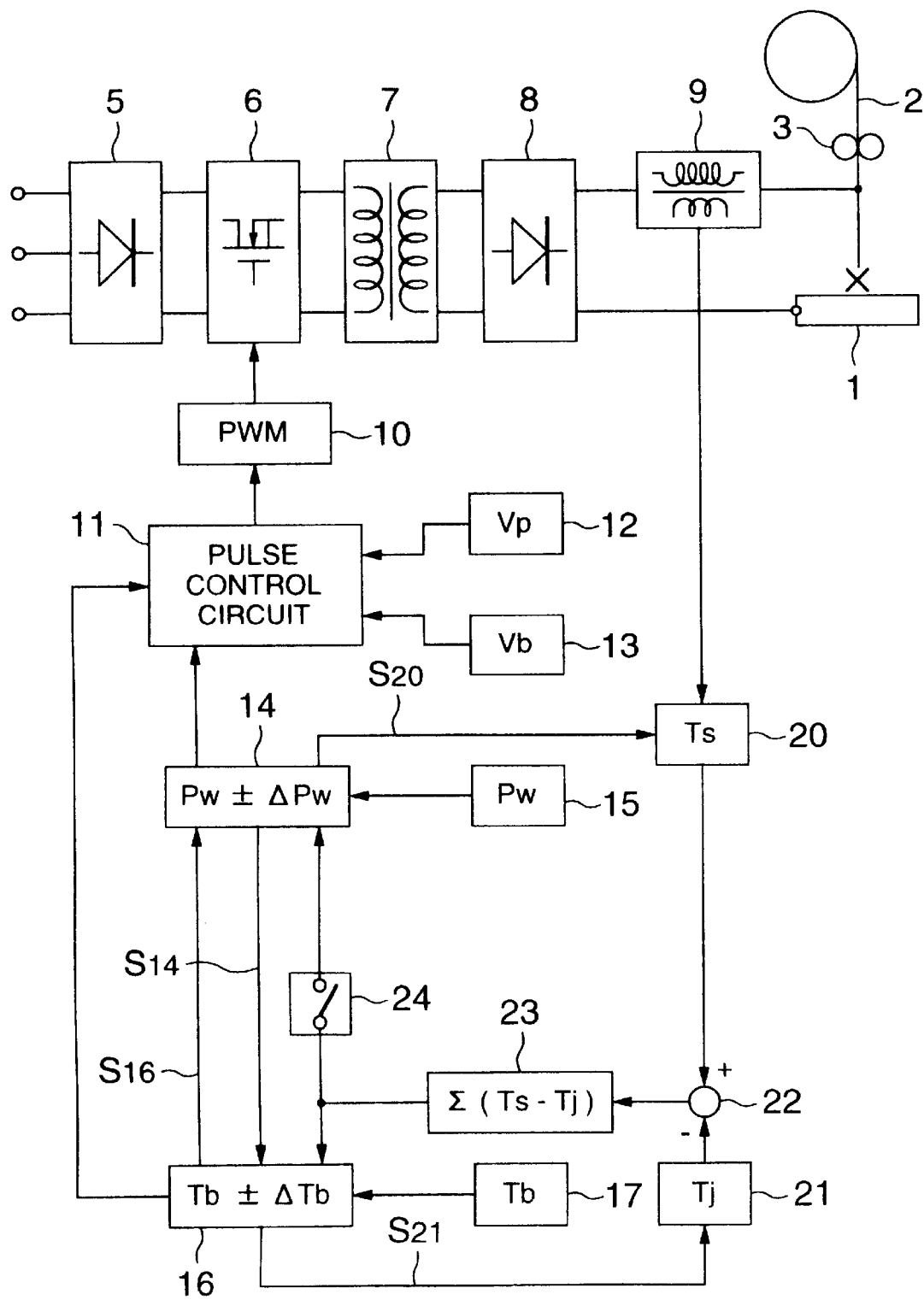
FIG. 1 is a block diagram showing a first embodiment of a pulsed arc welding apparatus according to the present invention.

FIG. 1 is a block diagram of a pulsed arc welding apparatus in which a pulsed arc welding method is executed according to an embodiment of the present invention. In FIG. 1, a reference numeral 1 represents a base metal, 2 a welding wire, and 3 a welding wire feed roller for feeding the welding wire at a predetermined speed. 5 indicates a primary rectifier for converting commercial alternating current to direct current working as a power source for welding, and 6 indicates an inverter circuit. This inverter circuit 6 is constituted using a switching element such as a field effect transistor (FET), and converts direct current outputted from the primary rectifier 5 into predetermined alternating current. 7 represents a transformer, 8 represents a secondary rectifier for rectifying an alternating current output of the transformer 7, and 9 represents a direct current reactor for smoothing the output of the secondary rectifier 8 and supplying the output to the welding wire. A secondary winding is applied to the direct current reactor 9, and detects a short circuit generated when the point of the welding wire 2 and the base metal 1 come into contact with each other through a droplet of the welding wire during welding.

10 represents a pulse width modulator (PWM) for determining ON/OFF time of the inverter circuit 6, and 11 represents a pulse control circuit for controlling a pulse width of the PWM 10. 12 represents a pulse voltage setting unit for setting a pulse voltage $V_p$ for generating a pulse current in pulsed arc welding, and 13 represents a base voltage setting unit for setting a base voltage $V_b$ for generating a base current in a similar manner, and these respective voltages $V_p$ and $V_b$ are outputted to the pulse control circuit 11. 14 represents a pulse width regulator for regulating a pulse width (a pulse voltage application period) in pulsed arc welding, 15 represents a pulse width setting unit for setting a pulse width $P_w$ concerned, 16 represents a base time regulator for also regulating the base time (a base voltage application period) in pulsed arc welding, and 17 represents a base time setting unit for setting a base time $T_b$ concerned.

In this way, the base time $T_b$ is started when it is detected that the pulse width $P_w$ is ended, and the pulse width $P_w$ is started when it is detected that the base time $T_b$ is ended (which is related to a period end signal $S_{14}$ of the pulse width and a period end signal $S_{16}$ of the base time). The pulse control circuit 11 is operated so that outputs determined by pulse voltage $V_p$ in the period of the pulse width $P_w$ and determined by base voltage $V_b$ in the period of the base time $T_b$ may be obtained.

20 represents a short circuit time detector for detecting continuation time of short circuit $T_s$ described above generated during welding. This short circuit time detector 20 receives an induced voltage generated in the secondary winding applied to the direct current reactor 9 thereby to detect the short circuit time $T_s$. The short circuit time $T_s$ and the induced voltage concerned will be described later. 21 represents a short circuit time setting unit for setting a target value $T_j$ of the short circuit time $T_s$, 22 represents a subtracter for receiving the short circuit time $T_s$ detected by the short circuit time detector 20 and the target value $T_j$ which has been set in the short circuit time setting unit 21 and computing the difference $(T_s-T_j)$ between them, 23 represents an integrated/mean value calculator for adding up $[\Sigma(T_s-T_j)]$ from the output of the adder 22, and 24 represents a selection switch for inputting the integrated value outputted from the integrated/mean value calculator 23 into the pulse width regulator 14 and selecting whether the pulse width $P_w$ is to be regulated or not. The integrated/mean value calculator 23 is illustrated in FIG. 1 so as to obtain the integrated value, but the mean value is obtainable when it is used by dividing the integrated value by a predetermined time or number of times.

Figure 2:
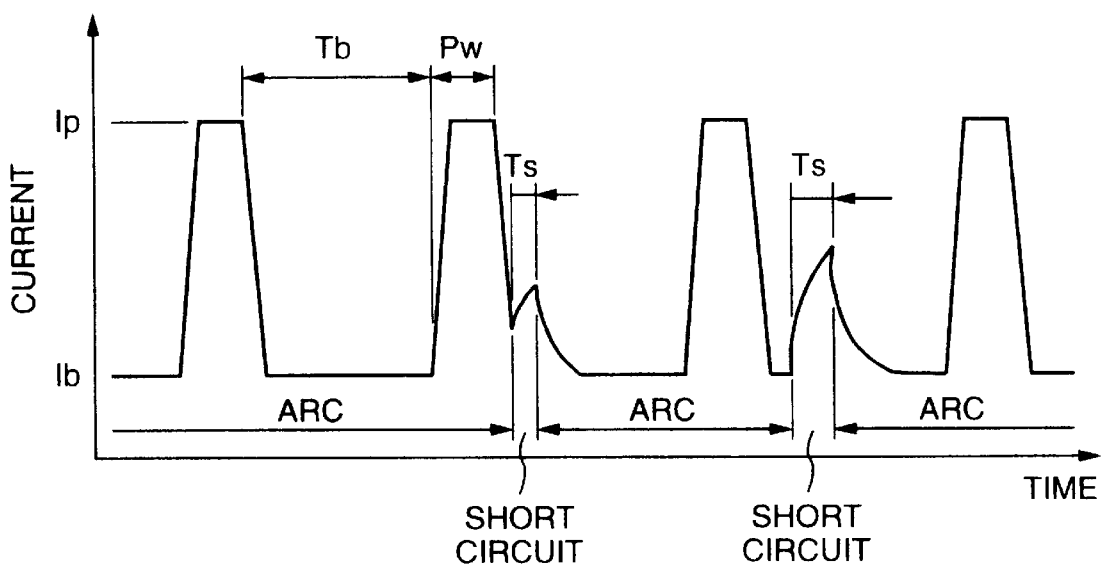
FIG. 2 is a waveform diagram showing a current at a time of welding.

Here, the above-mentioned short circuit time $T_s$ will be explained with reference to FIG. 2 and FIG. 3. FIG. 2 is a diagram showing the current at a time of welding, in which the abscissa represents time and the ordinate represents current. In pulsed arc welding, a large current (pulse current) $I_p$ is outputted during the period of the pulse width $P_w$ and a base current $I_b$ is outputted during the base period $T_b$ following the period of the pulse width $P_w$ as shown, thereby to perform welding. In the present embodiment, the pulse current $I_p$ is outputted based on the pulse voltage $V_p$ which is set by the pulse voltage setting unit 12 and the base current $I_b$ is outputted based on the base voltage $V_b$ which is set by the base voltage setting unit 13 as described above. Further, basic output periods thereof are determined by set values $P_w$ and $T_b$ of the pulse width setting unit 15 and the base time setting unit 17, respectively.

In case the above-mentioned short circuit is produced when welding is being executed in the embodiment described above, an irregular triangular wave is generated in the welding current as shown in FIG. 2 by an arc length self-control operation in the power source for welding having a constant voltage characteristic. The current increase portion of this triangular wave corresponds to the short circuit period (short circuit time) $T_s$. The short circuit time $T_s$ has a relative length as illustrated depending on the generating state of the short circuit. The relationship between the short circuit time $T_s$ and the arc voltage is shown in FIG. 3 with the feeding speed of the welding wire as a parameter.

Figure 3:
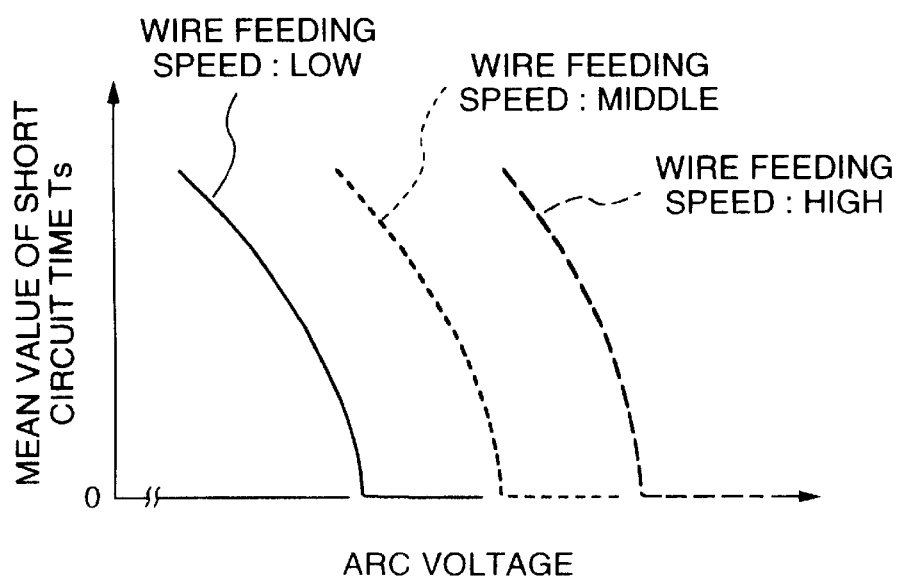
FIG. 3 is an explanatory diagram for explaining short circuit time.

FIG. 3 is a diagram explaining the short circuit time $T_s$, in which the abscissa represents the arc voltage (which is determined by the base time $T_b$) and the ordinate represents the mean value of the short circuit time $T_s$. In FIG. 3, the solid line indicates the mean value of the short circuit time $T_s$ in case the welding wire feeding speed is low, the broken line indicates the mean value of the short circuit time $T_s$ in case the welding wire feeding speed is high, and the dotted line indicates the mean value of the short circuit time $T_s$ in case the welding wire feeding speed is medium. As is apparent from FIG. 3, the mean value in a predetermined period of the short circuit time $T_s$ decreases with the increase of the arc voltage, and, when a predetermined arc voltage is exceeded, the short circuit is not generated, but the mean value of the short circuit $T_s$ becomes 0. Namely, since the distance between the low end surface of the droplet and the base metal 1 is large when the arc voltage is high, no short circuit is generated. Further, it can be seen that the relationship between the arc voltage and the mean value of the short circuit time $T_s$ remains almost the same even if the welding wire feeding speed is changed, and although the arc voltage at which the short circuit is no longer produced is different depending on the welding wire feeding speed, there is no substantial difference in the tendency thereof.

The short circuit time $T_s$ has been explained above. It may be concluded from the foregoing that, when the pulse voltage $V_p$, the base voltage $V_b$, and the pulse width $P_w$ are set in accordance with the material quality and the diameter of the welding wire 2 to be used, and the welding wire feeding speed (which relates to welding current), the arc voltage (which relates to base time $T_b$) in accordance with the welding work are selected, and the target value $T_j$ of the short circuit time $T_s$ is selected, and the short circuit time $T_s$ and the target value $T_j$ are compared with each other thereafter (the integrated value of the difference between them is used as described above in the present embodiment) and the short circuit time $T_s$ is made to approach to the target value $T_j$, it is possible to always maintain an appropriate short circuit state, such as a state wherein a minute short circuit in a very short time is not produced, automatically even when an erroneous arc voltage setting has been made or even when a change in welding conditions, disturbance for the arc condition or the like are produced.

Here, the determination of the target value $T_j$ of the short circuit time $T_s$ will be explained. In pulsed arc welding, the condition for obtaining a predetermined welding quality is not limited to one, but there are various conditions. Further, the arc state (welding conditions) that is easy to work is different depending on a worker who performs the welding work. Since the target value $T_j$ is a value for determining whether the arc voltage is set higher (the short circuit time $T_s$ is short) or the arc voltage is set lower (the short circuit time $T_s$ is long), it is desirable to make the target value $T_j$ freely selectable by a worker from a viewpoint of convenience in use for the worker.

Figure 4:
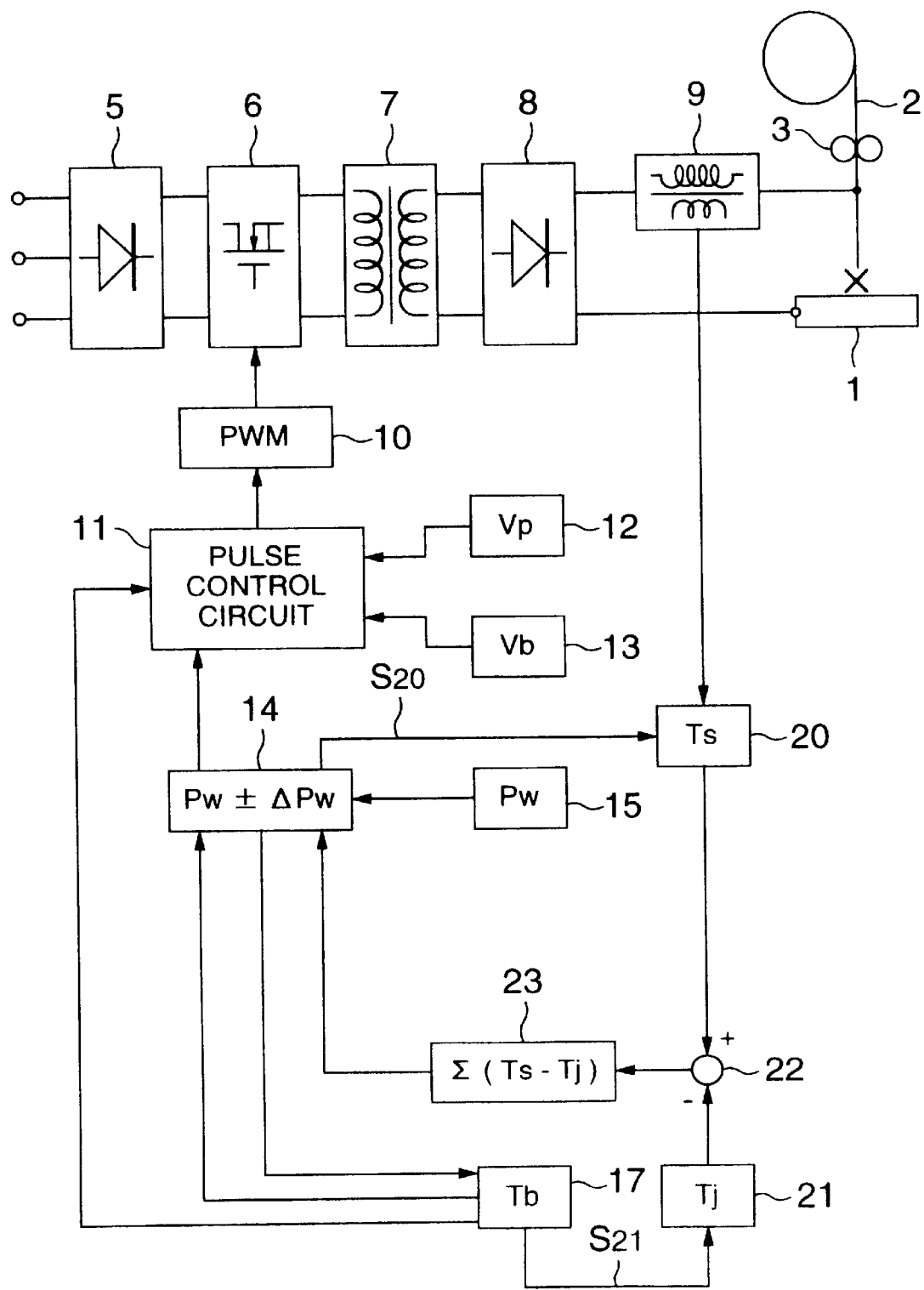
FIG. 4 is a block diagram showing another embodiment of a pulsed arc welding apparatus according to the present invention.

Next, another embodiment of a pulsed arc welding apparatus will be explained with reference to FIG. 4. The difference of the pulsed arc welding apparatus shown in FIG. 4 from what is shown in FIG. 1 exists in that the base time regulator 16 and the selection switch 24 shown in FIG. 1 are nonexistent. Namely, the integrated/mean value of the difference between the short circuit time $T_s$ and the target value $T_j$ from the integrated/mean value calculator 23 is supplied directly to the pulse width regulator 14. Further, a signal showing during the base time is supplied to the pulse control circuit 11 from the base time setting unit 17, and on the other hand, a signal showing the base period is supplied to the short time setting unit 21. Further, the base time setting unit 17 sends a signal showing that the base period is ended to the pulse width regulator 14, the pulse period is started with the signal, and a signal showing during the pulse period is sent to the pulse control circuit 11. When a predetermined pulse period $(P_w \pm \Delta P_w)$ is ended, the end signal thereof is sent from the pulse width regulator 14 to the base time setting unit 17, and the base time setting unit 17 sends a signal showing the base period to the pulse control circuit 11. With this, it is possible to control the arc length only by regulating the pulse width $P_w$. Since other structures are the same as those of what is shown in FIG. 1, description thereof is omitted.

Figure 5:
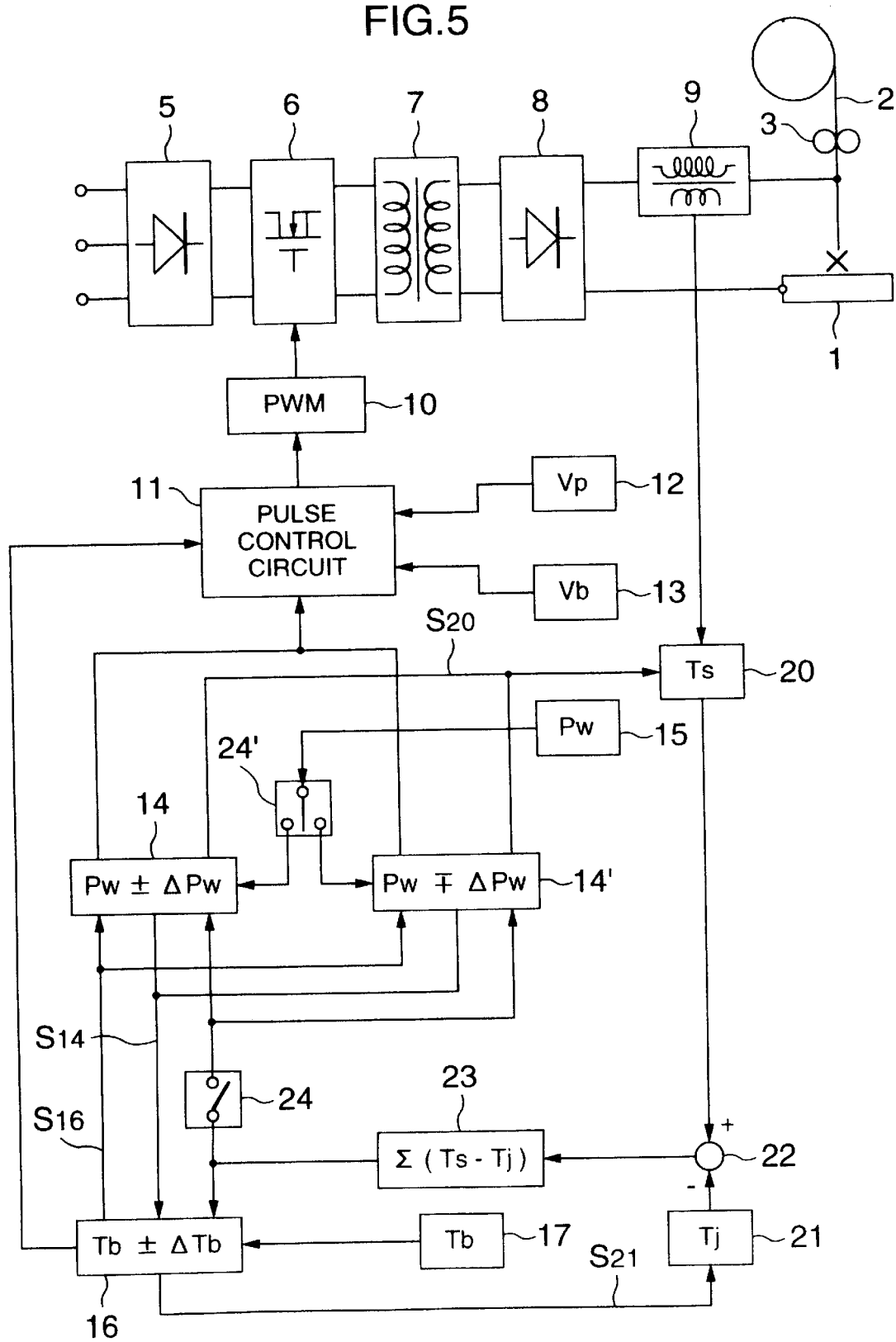
FIG. 5 is a block diagram showing still another embodiment of a pulsed arc welding apparatus according to the present invention.

Furthermore, another embodiment of a pulsed arc welding apparatus is shown in FIG. 5. The difference of the pulsed arc welding apparatus shown in FIG. 5 from what is shown in FIG. 1 is that a pulse width regulator 14' and a selection switch 24' are added further to what is shown in FIG. 1. With this, when it is required to compensate for resistance generation of heat due to the projected length of the welding wire 2 in addition to control the arc length with the base time $T_b$ and the pulse width $P_w$ as explained with reference to FIG. 1, the selection switch 24' is changed over to the side of the pulse width regulator 14', and the pulse width regulator 14' decreases the pulse width $P_w$ supplied through the selection switch 24' by a value $\Delta P_w$ conversely to the integration by the pulse width regulator 14 when the integrated value $\Sigma(T_s-T_j)$ supplied through the selection switch 24 is positive, and the pulse width regulator 14' increases the pulse width $P_w$ from the selection switch 24' by the value $\Delta P_w$ when the integrated value $\Sigma(T_s-T_j)$ is negative. Since other structures shown in FIG. 5 are the same as those shown in FIG. 1, description thereof is omitted.

Figure 6:
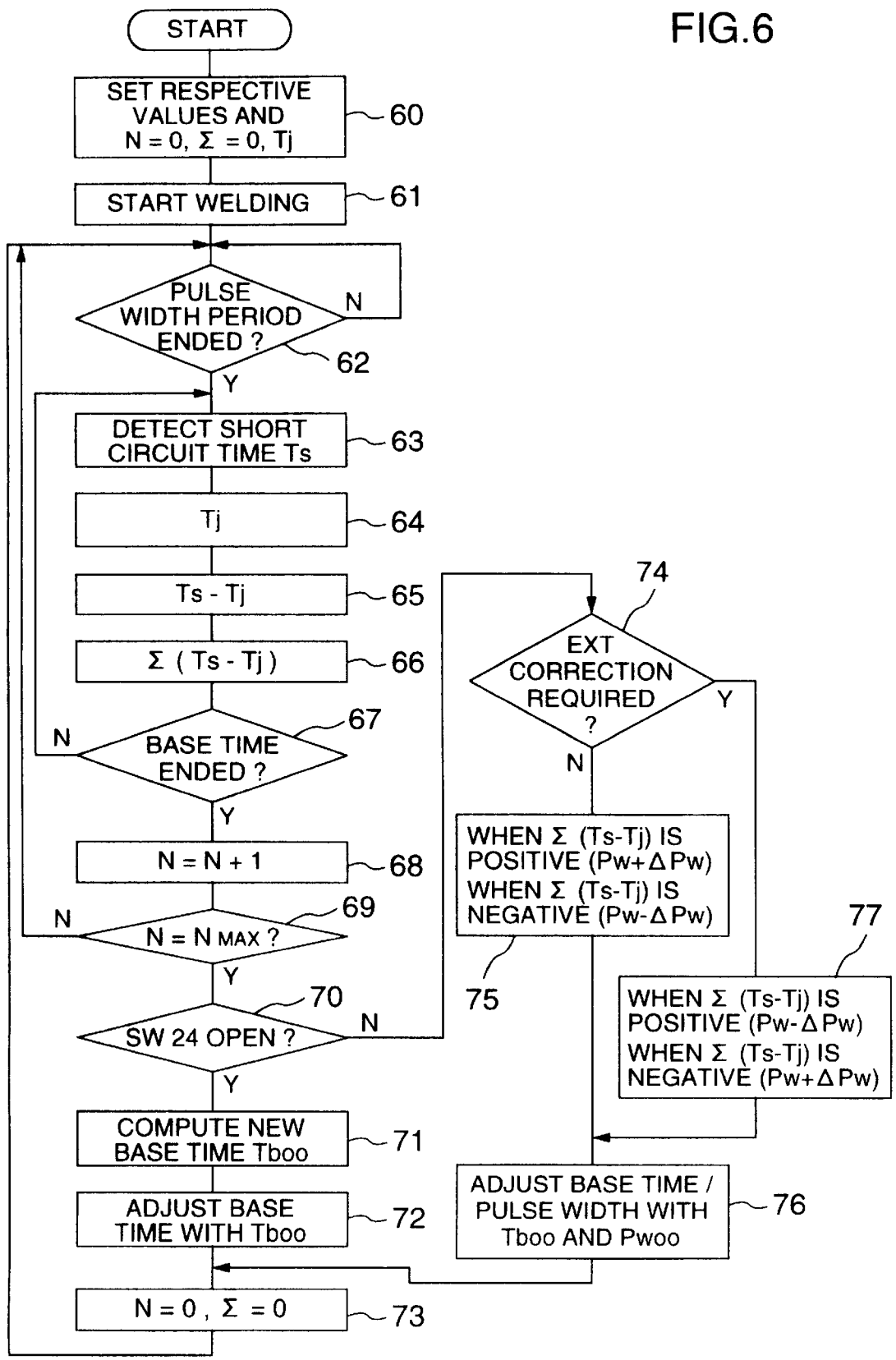
FIG. 6 is a flow chart for explaining a pulsed arc welding method according to the present invention.

Next, the operation of the present embodiment shown in FIG. 1 will be described based on FIG. 6. Besides, the apparatuses shown in FIG. 4 and FIG. 5 will be described later. First, in a step 60, respective values are set to the pulse voltage setting unit 12, the base voltage setting unit 13, the pulse width setting unit 15, the base time setting unit 17 and the short circuit time setting unit 21, thus resetting a counter. Welding is started in a step 61. At the start, a pulse current and a base current shown in FIG. 2 flow in accordance with these respective set values.

Induced voltage is generated in the secondary winding of the direct current reactor 9 during welding. When it is assumed that the inductance of the secondary winding concerned is $L_2$, a current passing therethrough is i, and the time is t, the induced voltage $e_2$ is expressed by the following expression.

$$e_2 = -L_2 \cdot (di/dt) \tag{1}$$

When a short circuit is generated by a droplet, the induced voltage $e_2$ shows a negative value since the current increases during the short circuit period, and, when the short circuit is opened, the induced voltage shows a positive value since the current decreases. However, since the induced voltage $e_2$ also shows a negative value at the leading period of pulse voltage $V_p$, in a step 62, a stop signal $S_{20}$ is outputted to the short circuit time detector 20 from the pulse width regulator 14 thereby to stop the detection operation thereof during the period of the pulse width $P_w$, so that no detection is made in this case. Then, when the pulse period is ended, in a step 63, the short circuit time detector 20 receives the induced voltage $e_2$ and obtains the time during which the induced voltage $e_2$ shows a negative value. This is the short circuit time.

On the other hand, the base time regulator 16 outputs a signal $S_{21}$ for notifying that the base time $T_b$ has been started to the short circuit time setting unit 21, and in a step 64, the short circuit time setting unit 21 outputs the target value $T_j$ to the adder 22 during a predetermined time (the time in which generation of a short circuit is anticipated) from the input of the signal $S_{21}$. In a step 65, the adder 22 receives the short circuit time $T_s$ from the short circuit time detector 20 and the target value $T_j$ from the short circuit time setting unit 21, computes the difference $(T_s-T_j)$ between both and outputs the result to the integrator 23. Namely, the difference $(T_s-T_j)$ between the short circuit time $T_s$ and the target value $T_j$ in the period $(P_w+T_b)$ is outputted from the adder 22 in every pulse period of $(P_w+T_b)$. In a step 66, the integrator 23 integrates the difference $(T_s-T_j)$ concerned successively and obtains the integrated value $\Sigma(T_s-T_j)$. In a step 67, when the base time has been ended, the processing proceeds ahead. In a step 70, when the selection switch 24 is kept opened, the integrated value $\Sigma(T_s-T_j)$ obtained by the integrated/mean value calculator 23 is outputted only to the base time regulator 16. This is what is called a case that the arc length is controlled only by the base time $T_b$. Here, in a step 68, a counter N is incremented, and, in a step 69, the counter is determined. When the counter shows the maximum value, in steps 71 and 72, the base time regulator 16 increases or decreases the present base time $T_b$ in accordance with the integrated value concerned when the integrated value $\Sigma(T_s-T_j)$ is inputted from the integrated/mean value calculator 23, and sets such new base time that the short circuit time $T_s$ becomes the target value $T_j$, i.e., the integrated value $\Sigma(T_s-T_j)$ becomes 0. An instance of this operation will be given. Now, when it is assumed that the present base time is $T_{b00}$ and a control constant is $\alpha$, the operation of new base time $T_{b00}$ is performed in accordance with the following expression.

$$T_{b00}=T_{b0}-\alpha \cdot \Sigma(T_s-T_j)=T_{b0}-\Delta T_b \qquad (2)$$

Namely, when the integrated value $\Sigma(T_s-T_j)$ is positive (the integrated value of the short circuit time $T_s$ is larger than the integrated value of the target value $T_j$), it is sufficient to decrease the mean value of the short circuit time $T_s$. For such a purpose, it is apparent to increase the arc voltage as it is apparent from FIG. 3. Thus, time $\Delta T_b$ in accordance with the integrated value $\Sigma(T_s-T_j)$ is decreased from the present base time so as to obtain new base time. Conversely, when the integrated value $\Sigma(T_s-T_j)$ is negative, time $\Delta T_b$ in accordance with the integrated value $\Sigma(T_s-T_j)$ is added to the present base time so as to obtain new base time. Besides, the control constant $\Delta$ is determined taking the material quality of the welding wire 2, the velocity of response of control or the like into consideration. Then, counters N, $\Sigma$ are reset in a step 73.

The new base time $T_{b00}$ obtained as described above is outputted to the pulse control circuit 11 in a step 72, and the pulse control circuit 11 outputs the ON/OFF command to a pulse width modulator 10 in accordance with this new base time $T_{b00}$, thus increasing or decreasing the base time. Further, in a period including this new base time $T_{b00}$, the short circuit time $T_s$ is detected again by means of the short circuit time detector 20 and the above-mentioned control operation is repeated.

The above-mentioned means is one that controls the base time $T_b$ only with the selection switch 24 kept opened, but it is capable of performing more effective control by controlling the pulse width $P_w$ in addition to the base time $T_b$. When such control is performed, the selection switch 24 is closed. By closing the selection switch 24, the integrated value $\Sigma(T_s-T_j)$ operated by the integrated/mean value calculator 23 is inputted to the base time regulator 16 and also to the pulse width regulator 14 at the same time. The pulse control circuit 11 also increases or decreases the pulse width $P_w$ similarly to the base time regulator 16. When it is not required in a step 74 to compensate for the resistance generation of heat due to the extension length of the welding wire 2, however, in a step 75, conversely to the base time regulator 16 the pulse width $P_w$ is increased $(P_w+\Delta P_w)$ by a value $\Delta P_w$ in accordance with the integrated value $\Sigma(T_s-T_j)$ in case the integrated value $\Sigma(T_s-T_j)$ is positive, and the pulse width $P_w$ is decreased $(P_w-\Delta P_w)$ by the value $\Delta P_w$ in accordance with the integrated value $\Sigma(T_s-T_j)$ in case the integrated value $\Sigma(T_s-T_j)$ is negative. This is carried out by making close a selection switch 24' to the pulse width regulator 14. In a step 76, the arc length is controlled with the base time $T_{b00}$ and the pulse width $(P_w \pm \Delta P_w)$.

When it is required to compensate for resistance generation of heat due to the extension length of the welding wire 2, in a step 74, it is recommended in a step 77 to decrease the pulse width $P_w$ by a value $\Delta_w$ when the integrated value $\Sigma(T_s-T_j)$ is positive and the pulse width $P_w$ is increased by the value $\Delta P_w$ when the integrated value $\Sigma(T_s-T_j)$ is negative conversely to the above. This is carried out by making close the selection switch 24' to the pulse width regulator 14'. This corresponds to the pulsed arc welding apparatus shown in FIG. 5. Since the pulsed arc welding apparatus shown in FIG. 4 can be comprehended easily from the operation explained based on FIG. 1, description thereof is omitted.

Since it has been made in the present embodiment to regulate the base time or the base time and the pulse width so as to bring the short circuit time generated during welding closer to the target value, it is possible to always maintain an appropriate short circuit state automatically even when a change in the welding condition or disturbance on the arc state and so on are produced, thus making it possible to secure a high welding quality easily and to uniformalize the welding quality.

Further, a considerable amount of skill has been required for setting the arc voltage in order to obtain an appropriate arc state in conventional pulsed arc welding. In the present embodiment, however, the skill of a worker is not required since inappropriate setting of the arc voltage is corrected automatically if any.

Furthermore, it is required to set appropriate arc voltage in accordance with the welding current in conventional pulsed arc welding, but, since the short circuit state is controlled in the present embodiment, it is not required to vary setting in accordance with the welding current (wire feeding speed), and the burden is largely improved for a worker.

A Table 1 shown below shows the result of welding in which the apparatus shown in FIG. 1 has been used. In this case, welding in which the welding current (i.e., welding wire feeding speed) and the initial voltage (i.e., the initial set value of the base time) has been performed using JIS YGW 17 having a diameter of 1.2 mm for the welding wire and assuming that the pulse voltage $V_p=39$ V, the base voltage $V_b=8.5$ V, the pulse width $P_w=1.4$ ms, the welding wire extension length (EXT)=15 mm, the welding speed=750 mm/min. and the target value $T_j=0.02$ ms. Besides, the symbols "○", "Δ", "▲" and "X" in the table show goodness of the result of welding in this order, and "○" shows the best and "X" shows inferiority. (The same is applied to a Table 2 and a Table 3 shown later.)

TABLE 1

| Welding current (A) | Initial arc voltage (V) | No control Convergent arc voltage (V) | Decision | $T_b$ control Convergent arc voltage (V) | Decision | $(T_b + P_w)$ control Convergent arc voltage (V) | Decision |
|---|---|---|---|---|---|---|---|
| 100 | 18.5 | 18.5 | X | 21.3~21.5 | ○ | 20.8~21.0 | ○ |
| (3.5 m/min) | 20.0 | 20.0 | ▲ | 21.0~21.5 | ○ | 21.3~21.5 | ○ |
|  | 21.5 | 21.5 | ○ | 21.0~21.5 | ○ | 21.0~21.5 | ○ |
|  | 23.0 | 23.0 | ▲ | 21.0~21.3 | ○ | 21.5 | ○ |
|  | 24.5 | 24.5 | X | 21.0~21.3 | ○ | 21.5 | ○ |
| 150 | 21.0 | 21.0 | X | 23.5~24.0 | ○ | 24.5 | ○ |
| (5.3 m/min) | 22.5 | 22.5 | ▲ | 34.5~24.0 | ○ | 24.0~24.5 | ○ |
|  | 24.0 | 24.0 | ○ | 23.5~24.0 | ○ | 23.2~24.0 | ○ |
|  | 25.5 | 25.5 | ▲ | 23.5~24.0 | ○ | 24.0~24.2 | ○ |
|  | 27.0 | 27.0 | X | 23.5~24.0 | ○ | 23.8~24.0 | ○ |
| 200 | 22.5 | 22.5 | X | 25.5~26.0 | ○ | 25.0, 25.5 | ○ |
| (7.7 m/min) | 24.0 | 24.0 | ▲ | 25.5~26.0 | ○ | 25.0~25.5 | ○ |
|  | 25.5 | 25.5 | ○ | 25.3~25.5 | ○ | 26.0 | ○ |
|  | 27.0 | 27.0 | ▲ | 25.8~26.0 | ○ | 25.8~26.0 | ○ |
|  | 28.5 | 28.5 | X | 25.8~26.0 | ○ | 25.8~26.0 | ○ |
| 250 | 23.5 | 23.5 | X | 26.2~26.5 | ○ | 26.5 | ○ |
| (8.7 m/min) | 25.0 | 25.0 | ▲ | 26.0 | ○ | 26.5 | ○ |
|  | 26.5 | 26.5 | ○ | 26.3~26.5 | ○ | 26.0~26.5 | ○ |
|  | 27.5 | 27.5 | ▲ | 26.0 | ○ | 28.5 | ○ |
|  | 28.5 | 28.5 | X | 26.0~26.3 | ○ | 26.5 | ○ |
| 300 | 24.0 | 24.0 | X | 27.2~27.5 | ○ | 28.5 | ○ |
| (11.8 m/min) | 25.0 | 25.0 | ▲ | 27.2~27.5 | ○ | 28.2 | ○ |
|  | 26.0 | 26.0 | Δ | 27.5 | ○ | 28.0 | ○ |
|  | 27.0 | 27.0 | ○ | 27.2~27.5 | ○ | 27.8 | ○ |

Welding wire: JIS YGV17 · φ1.2 mm
$T_j$ = 0.02 ms, $V_p$ = 39 V, $V_b$ = 8.5 V, $P_w$ = 1.4 ms,
Ext = 15 mm, Welding speed = 750 mm/min In respective welding currents, the initial arc voltage has been varied within a range of an proper value ±3 V, but the arc voltage has been converged to proper arc voltage automatically in every case. Besides, a method of controlling the base time $T_b$ only and a method of performing automatic control in which the pulse width $P_w$ is increased when the integrated value $\Sigma(T_s-T_j)$ is positive and the pulse width $P_w$ is decreased when the integrated value $\Sigma(T_s-T_j)$ is negative along with automatic control of the base time $T_b$ have been examined as the control method, but satisfactory results have been obtained in either control method.

A Table 2 below shows another result of welding. In this case, welding similar to the case of the Table 1 has been performed using JIS YGW 15 having a diameter of 1.6 mm for the welding wire and assuming that the pulse voltage $V_p$=43 V, the base voltage $V_b$=10 V, the pulse width $P_w$=1.9 ms, the welding wire extension length (EXT)=20 mm, the welding speed=750 mm/min, and the target value $T_j$=0.03 ms. In this case, satisfactory results have also been obtained in either case of automatic control of the base time and automatic control of the base time and the pulse width.

TABLE 2

| Welding current (A) | Initial arc voltage (V) | No control Convergent arc voltage (V) | Decision | $T_b$ control Convergent arc voltage (V) | Decision | $(T_b + P_w)$ contrtol Convergent arc voltage (V) | Decision |
|---|---|---|---|---|---|---|---|
| 150 | 19.5 | 19.5 | X | 22.5~23.0 | ○ | 22.5~23.0 | ○ |
| (2.7 m/min) | 21.0 | 21.0 | ▲ | 22.5~23.0 | ○ | 22.5 | ○ |
|  | 22.5 | 22.5 | ○ | 22.5 | ○ | 22.0~22.5 | ○ |
|  | 24.0 | 24.0 | ▲ | 22.5~23.0 | ○ | 22.0~22.5 | ○ |
|  | 25.5 | 25.5 | X | 22.5~23.0 | ○ | 22.5~23.0 | ○ |
| 200 | 21.0 | 21.0 | X | 22.8~23.2 | ○ | 23.0~23.5 | ○ |
| (3.5 m/min) | 22.5 | 22.5 | ▲ | 23.0~23.5 | ○ | 23.0~23.5 | ○ |
|  | 24.0 | 24.0 | ○ | 22.5~23.0 | ○ | 23.0~23.5 | ○ |
|  | 25.5 | 25.5 | ▲ | 22.5~23.0 | ○ | 23.5~24.0 | ○ |
|  | 27.0 | 27.0 | X | 23.0~23.5 | ○ | 23.5~24.0 | ○ |
| 250 | 22.0 | 22.0 | X | 25.5~26.0 | ○ | 25.0, 25.5 | ○ |
| (5.3 m/min) | 23.5 | 23.5 | ▲ | 24.5~25.0 | ○ | 24.5~25.0 | ○ |
|  | 25.0 | 25.0 | ○ | 25.0~25.3 | ○ | 25.0~25.5 | ○ |
|  | 26.5 | 26.5 | ▲ | 24.5~25.0 | ○ | 24.5~25.0 | ○ |
|  | 28.0 | 28.0 | X | 25.0~25.5 | ○ | 24.5~25.0 | ○ |
| 300 | 23.0 | 23.0 | X | 25.5~26.0 | ○ | 26.0~26.3 | ○ |
| (5.8 m/min) | 24.5 | 24.5 | ▲ | 25.8~26.3 | ○ | 25.8~26.2 | ○ |
|  | 26.0 | 26.0 | ○ | 25.5~26.0 | ○ | 26.0~26.2 | ○ |

TABLE 2-continued

| Welding current (A) | Initial arc voltage (V) | No control | | $T_b$ control | | $(T_b + P_w)$ contrtol | |
|---|---|---|---|---|---|---|---|
| | | Convergent arc voltage (V) | Decision | Convergent arc voltage (V) | Decision | Convergent arc voltage (V) | Decision |
| 350 (6.5 m/min) | 27.5 | 27.5 | ▲ | 25.5~26.0 | ○ | 26.0~26.2 | ○ |
| | 29.0 | 29.0 | X | 25.5~26.0 | ○ | 26.0~26.3 | ○ |
| | 24.0 | 24.0 | X | 26.5~26.8 | ○ | 26.8~27.0 | ○ |
| | 25.5 | 25.5 | ▲ | 26.5~26.8 | ○ | 26.5~27.0 | ○ |
| | 27.0 | 27.0 | ○ | 26.5~27.0 | ○ | 26.0~26.5 | ○ |
| | 28.5 | 28.5 | ▲ | 26.8~27.0 | ○ | 26.5 | ○ |
| | 30.0 | 30.0 | X | 27.0~27.2 | ○ | 26.0~26.5 | ○ |

Welding wire: JIS YGV17 · φ1.6 mm
$T_j$ = 0.03 ms, $V_p$ = 43 V, $V_b$ = 10 V, $P_w$ = 1.9 ms,
Ext = 20 mm, Welding speed = 750 mm/min A Table 3 below shows another result of welding. In this case, the welding conditions are set the same as the Table 1, the automatic control of the base time and the automatic control of the pulse width are performed at the same time, and, in the automatic control of the pulse width, the pulse width $P_w$ is decreased when the integrated value $\Sigma(T_s-T_j)$ is positive and the pulse width $P_w$ is increased when the integrated value $\Sigma(T_s-T_j)$ is negative. In this case, it could also be confirmed that the arc voltage was all converged to proper arc voltage irrespective of the initial set value thereof.

TABLE 3

| Initial arc set value | | $(T_b)$ control | | | $(T_b + P_w)$ contrtol | | |
|---|---|---|---|---|---|---|---|
| Set voltage (V) | $T_b$ (ms) | $P_w$ (ms) | Convergent arc voltage (V) | $T_b$ (ms) | $P_w$ (ms) | Convergent arc voltage (V) | $T_b$ (ms) | $P_w$ (ms) |
| 21.0 | 7.8 | 1.6 | 24.3~24.5 | 4.7 | 1.6 | 25.3 | 3.5 | 1.34 |
| 22.5 | 6.3 | | 24.5~25.0 | 4.4 | | 25.0 | 3.9 | 1.40 |
| 24.0 | 5.4 | | 24.0~24.5 | 4.7 | | 24.5 | 4.0 | 1.46 |
| 25.5 | 4.0 | | 24.0~24.5 | 4.8 | | 24.5 | 5.0 | 1.66 |
| 27.0 | 3.5 | | 24.0~24.5 | 4.6 | | 24.5 | 4.8 | 1.74 |

Welding wire: JIS YGV17 · φ1.2 mm, Welding wire feeding speed = 5.3 m/min (≈150 A)
Welding speed = 750 mm/min, Ext = 15 mm, $V_p$ = 39 V, $V_b$ = 8.5 V, *$T_j$ = 0.02 ms Besides, pulsed arc welding of a constant voltage system has been explained in the description of the present embodiment. However, it is apparent that the present invention is also applicable to pulsed arc welding of a constant current system. Further, the short circuit time has been described citing an instance of using the integrated value $\Sigma(T_s-T_j)$, i.e., an instance in which the integrated value of the short circuit time is compared with a predetermined value (integrated value of the target value $T_j$), but it may also be arranged so that only the short circuit time $T_s$ is integrated and the mean value thereof is compared with the target value $T_j$.

What is claimed is:

1. A pulsed arc welding method for welding by supplying a pulse current and a base current alternately across a consumable electrode and a base metal, comprising the steps of:
    detecting a time during which a short circuit produced by melting of said consumable electrode is generated; and
    controlling an arc length so that one of a mean value and an integrated value of the time becomes a target value.

2. A pulsed arc welding method according to claim 1, wherein said arc length is controlled so that when said one of said mean value and said integrated value is larger than said target value, a supply time of said base current is decreased in accordance with a difference therebetween, and when said one of said mean value and said integrated value is smaller than said target value, a supply time of said base current is increased in accordance with a difference therebetween.

3. A pulsed arc welding method according to claim 1, wherein said arc length is controlled so that when said one of said mean value and said integrated value is larger than said target value, a supply time of said base current is decreased and a supply period of said pulse current is increased simultaneously in accordance with a difference therebetween, and when said one of said mean value and said integrated value is smaller than said target value, a supply time of said base current is increased and a supply period of said pulse current is decreased simultaneously in accordance with a difference therebetween.

4. A pulsed arc welding method according to claim 1, wherein said arc length is controlled so that when said one of said mean value and said integrated value is larger than said target value, respective supply periods of said base current and said pulse current are decreased in accordance with a difference therebetween, and when said one of said mean value and said integrated value is smaller than said target value, respective supply periods of said base current and said pulse current are increased in accordance with a difference therebetween.

5. A pulsed arc welding method according to claim 1, wherein said arc length is controlled so that when said one of said mean value and said integrated value is larger than said target value, a supply period of said pulse current is increased in accordance with a difference therebetween, and when said one of said mean value and said integrated value is smaller than said target value, a supply period of said pulse current is decreased in accordance with a difference therebetween.

6. A pulsed arc welding method according to claim 1, wherein the detecting step includes the step of detecting a duration of the time during which the short circuit is generated; and
    wherein the controlling step includes the step of controlling the arc length so that one of a mean value and an integrated value of the duration of the time during which the short circuit is generated becomes the target value.

7. A pulsed arc welding apparatus for welding by supplying a pulse current and a base current alternately across a consumable electrode and a base metal, comprising:

short circuit detecting means for detecting a time during which a short circuit produced by melting of said consumable electrode is generated;

comparison means for comparing one of an integrated value and a mean value of a short circuit time detected by the short circuit detecting means with a target value; and control means for controlling at least one of a supply time of said pulse current and a supply time of said base current in accordance with a result of the comparison by said comparison means.

8. A pulsed arc welding apparatus according to claim 7, wherein said comparison means includes:

a base time setting unit for setting the supply time of the base current;

a pulse width setting unit for setting the supply time of the pulse current;

a subtracter for obtaining a difference between the short circuit time detected by said short circuit detecting means and a predetermined short circuit setting time;

an integrated/mean value calculator for generating one of an integrated value and a mean value of the difference from said subtracter;

a base time regulator for at least one of increasing and decreasing the supply time of said base current from said base time setting unit in accordance with said one of said integrated value and said mean value, and obtaining a time of ending to supply the base current;

a selection switch which is closed when said one of said integrated value and said mean value from said integrated/mean value calculator is received; and a pulse width regulator for receiving said one of said integrated value and said mean value through said selection switch, at least one of increasing and decreasing the supply time of said pulse current from said pulse width setting unit, and obtaining a time for terminating the supply of the pulse current.

9. A pulsed arc welding apparatus according to claim 7, wherein said comparison means includes:

a base time setting unit for setting the supply time of the base current;

a pulse width setting unit for setting the supply time of the pulse current;

a subtracter for obtaining a difference between the short circuit time detected by said short circuit detecting means and a short circuit setting time calculated in accordance with the supply time of the base current from said base time setting unit;

an integrated/mean value calculator for generating one of an integrated value and a mean value of the difference from said subtracter; and a pulse width regulator for at least one of increasing and decreasing the supply time of said pulse current from said pulse width setting unit in accordance with said one of said integrated value and said mean value, and obtaining a time of terminating the supply of the pulse current.

10. A pulsed arc welding apparatus according to claim 7, wherein said comparison means includes:

a base time setting unit for setting the supply time of the base current;

a pulse width setting unit for setting the supply time of the pulse current;

a subtracter for obtaining a difference between the short circuit time detected by said short circuit detecting means and a predetermined short circuit setting time;

an integrated/mean value calculator for generating one of an integrated value and a mean value of the difference from said subtracter;

a base time regulator for at least one of increasing and decreasing the supply time of said base current from said base time setting unit in accordance with said one of said integrated value and said mean value, and obtaining a time of ending to supply the base current;

a first selection switch which is closed when said one of said integrated value and said mean value from said integrated/mean value calculator is received;

a first pulse width regulator for receiving said one of said integrated value and said mean value through said first selection switch, receiving said pulse current supply time from said pulse width setting unit when a second selection switch is in a first state, decreasing a pulse width when said one of said integrated value and said mean value is positive, and increasing a pulse width when said one of said integrated value and said mean value is negative; and a second pulse width regulator for receiving said one of said integrated value and said mean value through said first selection switch, receiving said pulse current supply time from said pulse width setting unit when said second selection switch is in a second state, increasing a pulse width when said one of said integrated value and said mean value is positive, and decreasing a pulse width when said one of said integrated value and said mean value is negative;

wherein said first pulse width regulator and said second pulse width regulator obtain a time for terminating the supply of the pulse current, respectively.

11. A pulsed arc welding apparatus according to claim 7, wherein said short circuit detecting means, said comparison means, and said control means are based on a constant voltage system.

12. A pulsed arc welding apparatus according to claim 7, wherein said short circuit detecting means, said comparison means, and said control means are based on a constant current system.

13. A pulsed arc welding apparatus according to claim 7, wherein the short circuit detecting means detects a duration of the time during which the short circuit is generated;

wherein the comparison means compares one of an integrated value and a mean value of the duration of the short circuit time detected by the short circuit detecting means with the target value; and wherein the control means controls at least one of the supply time of the pulse current and the supply time of the base current in accordance with a result of the comparison by the comparison means.

* * * * *